(12) United States Patent
Wang et al.

(10) Patent No.: US 10,005,966 B2
(45) Date of Patent: Jun. 26, 2018

(54) METHOD FOR MODIFYING BIO-OIL DERIVED FROM BIOMASS PYROLYSIS

(71) Applicant: Wuhan Kaidi Engineering Technology Research Institute Co., Ltd., Wuhan (CN)

(72) Inventors: Dashan Wang, Wuhan (CN); Dechen Song, Wuhan (CN); Qianqian Liu, Wuhan (CN); Shenke Zheng, Wuhan (CN); Xiaodong Zhan, Wuhan (CN); Jiaqi Jin, Wuhan (CN); Yanfeng Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 94 days.

(21) Appl. No.: 14/935,429

(22) Filed: Nov. 8, 2015

(65) Prior Publication Data

US 2016/0060539 A1   Mar. 3, 2016

Related U.S. Application Data

(63) Continuation-in-part of application No. PCT/CN2014/074975, filed on Apr. 9, 2014.

(30) Foreign Application Priority Data

May 7, 2013  (CN) .......................... 2013 1 0163449

(51) Int. Cl.

| | |
|---|---|
| *C10G 33/04* | (2006.01) |
| *C10G 3/00* | (2006.01) |
| *C10G 11/18* | (2006.01) |
| *B01D 17/04* | (2006.01) |
| *B01J 29/08* | (2006.01) |
| *C10B 53/02* | (2006.01) |
| *C10L 1/02* | (2006.01) |
| *B01J 29/40* | (2006.01) |

(52) U.S. Cl.
CPC ............. *C10G 3/49* (2013.01); *B01D 17/047* (2013.01); *B01J 29/088* (2013.01); *B01J 29/405* (2013.01); *C10B 53/02* (2013.01); *C10G 11/18* (2013.01); *C10G 33/04* (2013.01); *C10L 1/02* (2013.01); *B01J 2229/186* (2013.01); *B01J 2229/36* (2013.01); *B01J 2229/42* (2013.01); *C10G 2300/1011* (2013.01); *Y02E 50/14* (2013.01); *Y02P 30/20* (2015.11)

(58) Field of Classification Search
CPC ............................. C10G 33/04; B01D 17/047
See application file for complete search history.

(56) References Cited

U.S. PATENT DOCUMENTS

| | | | | | |
|---|---|---|---|---|---|
| 4,058,453 | A | * | 11/1977 | Patel ...................... | C10G 33/04 208/188 |
| 4,639,308 | A | * | 1/1987 | Lee ........................ | C10G 11/18 208/100 |
| 5,045,212 | A | * | 9/1991 | Augustin ............. | B01D 17/047 210/708 |
| 5,298,153 | A | * | 3/1994 | Scherzer ................ | B01J 29/084 208/120.01 |
| 6,528,447 | B1 | * | 3/2003 | Ghosh .................... | C10G 11/05 502/64 |
| 8,192,627 | B2 | * | 6/2012 | Gallop ...................... | C11B 3/08 210/634 |
| 2011/0213188 | A1 | * | 9/2011 | Agblevor ................ | C10B 47/24 585/242 |
| 2011/0245554 | A1 | * | 10/2011 | Huber .................... | B01J 23/002 585/251 |

OTHER PUBLICATIONS

Song et al. Effective Phase Separation of Biomass Pyrolysis Oils by Adding Aqueous Salt Solutions. Energy & Fuels 2009, 23, 3307-3312. (Year: 2009).*

* cited by examiner

*Primary Examiner* — In Suk C Bullock
*Assistant Examiner* — Alyssa L Cepluch
(74) *Attorney, Agent, or Firm* — Matthias Scholl P.C.; Matthias Scholl

(57) ABSTRACT

A method for modifying bio-oil derived from biomass pyrolysis, the method including: 1) adding an inorganic salt and an organic demulsifier to a bio-oil; oscillating or stirring the resulting mixture, and resting the resulting mixture, to yield a lower layer being an aqueous solution and an upper layer being the bio-oil, and collecting the bio-oil; 2) employing a zeolite molecular sieve-loaded clay as a catalyst, and aging the catalyst using pure steam, to yield a modified catalyst; and 3) adding the modified catalyst obtained in 2) to a conventional catalytic cracking reactor, injecting the bio-oil obtained in 1) to the conventional catalytic cracking reactor using a piston pump, and allowing the bio-oil to react under a weight hourly space velocity (WHSV) of between 6 and 15 $h^{-1}$, a temperature of between 380 and 700° C., and a pressure between 0.1 and 0.8 megapascal.

11 Claims, No Drawings

METHOD FOR MODIFYING BIO-OIL DERIVED FROM BIOMASS PYROLYSIS

CROSS-REFERENCE TO RELATED APPLICATIONS

This application is a continuation-in-part of International Patent Application No. PCT/CN2014/074975 with an international filing date of Apr. 9, 2014, designating the United States, now pending, and further claims priority benefits to Chinese Patent Application No. 201310163449.5 filed May 7, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a method for modifying bio-oil derived from biomass pyrolysis.

Description of the Related Art

Typically, bio-oil derived from biomass pyrolysis has high oxygen content, high acidity, high viscosity, low calorific value, and is unstable, and so it cannot directly be used as fuel.

To improve the quality of bio-oil, distillation and catalytic hydrogenation are often performed. However, distillation increases the viscosity of bio-oil and results in agglomeration. In addition, bio-oil includes low boiling point components, and distillation may cause a loss thereof. Furthermore, the devices for catalytic hydrogenation are complex and expensive, and during the production process, the reactor tends to become clogged and the catalyst tends to become inactive.

SUMMARY OF THE INVENTION

In view of the above-described problems, it is one objective of the invention to provide a method for modifying bio-oil derived from biomass pyrolysis. The physical and chemical properties of the modified bio-oil have been greatly improved.

To achieve the above objective, in accordance with one embodiment of the invention, there is provided a method for modifying bio-oil derived from biomass pyrolysis, the method comprising the following steps:

1) demulsification and stratification to remove water: adding an inorganic salt and an organic demulsifier into a bio-oil, a mass ratio of the inorganic salt to the bio-oil being between 1:2000 and 1:800, and a mass ratio of the organic demulsifier and the bio-oil being between 1:4000 and 1:1000; oscillating or stirring a resulting mixture, resting the resulting mixture until a lower layer is clarified and an oil-water interface is clear, to yield the lower layer being an aqueous solution and an upper layer being the bio-oil, and collecting the bio-oil;
2) employing a zeolite molecular sieve-loaded clay as a catalyst, and aging the catalyst at a temperature of between 500 and 800° C. for between 2 and 8 hours using 100% steam (pure water in the gas phase), to yield a modified catalyst; and
3) adding the modified catalyst obtained in 2) to a conventional catalytic cracking reactor, injecting the bio-oil obtained in 1) to the conventional catalytic cracking reactor using a piston pump, a ratio of the catalyst to the bio-oil being between 1:3 and 1:16, and allowing the bio-oil to react under a weight hourly space velocity (WHSV) of between 6 and 15 $h^{-1}$, a temperature of between 380 and 700° C., and a pressure between 0.1 and 0.8 megapascal.

In a class of this embodiment, the catalyst employed in 2) is selected from REY-type zeolite/clay, REUSY-type zeolite/clay, silicon-rich REUSY-type zeolite/clay, LREHY-type zeolite/clay, and ZSM-5-type zeolite/clay; a corresponding performed catalyst is allowed to exchange ions with 1 mol/L of $NH_4NO_3$, and then is calcined at between 150 and 300° C. for 2 to 4 hours to yield the modified catalyst having deoxygenation properties.

In a class of this embodiment, the inorganic salt comprises at least one of the following ions: $Ca^{2+}$, $Na^+$, $K^+$, $Al^{3+}$, $Fe^{2+}$, $NH^4$, $Cl^-$, $SO_4^{2-}$, and $NO_3^-$.

In a class of this embodiment, the organic demulsifier is selected from: polyoxypropylene ether, polyoxylethylene ether, propylene glycol, and propanol.

In a class of this embodiment, the inorganic salt comprises at least one of the following ions: $Na^+$, $NH_4^+$, $Cl^-$, and $SO_4^{2-}$.

In a class of this embodiment, the mass ratio of the inorganic salt to the bio-oil is between 1:1500 and 1:1000; the mass ratio of the organic demulsifier to the bio-oil is between 1:2000 and 1:1300.

In a class of this embodiment, before aging the catalyst in 2), a corresponding performed catalyst is allowed to exchange ions with 1 mol/L of $NH_4NO_3$, and then is calcined at between 150 and 300° C. for 2 to 4 hours to yield the modified catalyst having deoxygenation properties.

In a class of this embodiment, in 1), the resulting mixture is oscillated or stirred for 3 to 60 minutes, and then is allowed to rest for 20±5 minutes.

Compared with existing technologies, advantages of the method for modifying bio-oil derived from biomass pyrolysis according to embodiments of the invention are as follows:

1. Demulsifier and inorganic salt are employed to remove water by demulsification and stratification. The oil-water separation can be realized under normal temperature, and thus water is removed. The demulsifier accelerates the oil-water separation, and the inorganic salt break the electric double layer of the emulsion, thus speeding up the stratification of water, meanwhile the hydrophilic-lipophilic balance of the emulsion is changed, thereby improving the oil-water separation effect. The oil-water separation is carried on at normal temperature so that the aging of the bio-oil is prevented.

2. Most of water in the bio-oil is removed by demulsification and stratification and oil-water separation, so the upper layer of the bio-oil has water content lower than 8% (mass ratio). Small amount of residual water can decrease the viscosity of the bio-oil, maintain a good fluidity and facilitate the material feeding.

3. The catalytic cracking reaction lasts a short time, so cracking can be carried on before the aging of the bio-oil, to produce stable short-chain hydrocarbons and cracking gas.

4. Modification of the catalyst, especially through ion exchange, can improve the acidity of the catalyst, improve the deoxygenation properties of the catalyst, and brings a more effective deoxygenation for bio-oil.

5. Modification of the catalyst can endow the catalyst with high activity and high deoxygenation properties, and oxygen in the bio-oil can be removed in the form of $H_2O$, CO or $CO_2$, without consumption of reducing gases.

6. The process is simple, the involved apparatus is cheap, and the cost is low, all of which facilitate large-scale applications of the method.

DETAILED DESCRIPTION OF THE EMBODIMENTS

For further illustrating the invention, experiments detailing a method for modifying bio-oil derived from biomass pyrolysis are described below. It should be noted that the following examples are intended to describe and not to limit the invention.

In the examples, water content in bio-oil is tested by Karl Fischer titration (GB 11146). Acidity of bio-oil is tested by Determination of acid number of Petroleum products (GB/T264-1991). Viscosity of bio-oil is tested by capillary viscometer. Low calorific value of bio-oil is tested by Heating Value Determination Method of Coal Water Slurry (GB/T18856). And elements C, H, O in bio-oil are tested by an elemental analyzer.

Example 1

1000 g of bio-oil was placed in a 1500 mL three-necked flask, and then 0.5 g of sodium chloride and 0.25 g of polyoxypropylene ether were added with stirring. The bio-oil and the demulsifier were stirred for 5 minutes, and then the mixture was transferred to a separating funnel to rest for 20 minutes. When the lower layer which was an aqueous solution was clarified and the oil-water interface was clear, an upper layer which was bio-oil I was separated from the aqueous solution.

The performed silicon-rich REUSY/clay catalyst was added to a 80° C. 1 mol/L of $NH_4NO_3$ solution, and was soaked for 6 hours. Then the catalyst was dried and roasted for 3 hours under 150° C. The catalyst was aged for 3 hours by 100% steam at 600° C. 200 g of catalyst was weighed and placed in a fixed fluidized bed, and the catalytic cracking was carried on under the following parameters: a Weight Hourly Space Velocity (WHSV): 6 $h^{-1}$; a ratio of the catalyst to the bio-oil: 8, a temperature: 450° C.; and a pressure: 0.2 megapascal. An analysis result of the cracking product is shown as Table 1.

TABLE 1

Result of Catalytic Cracking of Bio-oil I (P = 1 atm, T = 28° C.)

| | | | | | Low | | | |
| | | Content | Acidity | Kinematic | calorific | | | |
| | Yield | of water | mgKOH/100 | viscosity | value | Element analysis (%) | | |
| | wt. % | wt. % | mL | mm²/s | MJ/kg | C | H | O |
| Bio-oil | — | 32.3 | 6965 | 16.5 | 12.3 | 47.03 | 6.78 | 44.92 |
| Dehydrated bio-oil | — | 23.4 | 6820 | 37.7 | 13.5 | 52.67 | 5.50 | 40.11 |
| Result after modification | 75.5 | — | 370 | 16.9 | 20.6 | 60.65 | 6.97 | 30.75 |

Example 2

1000 g of bio-oil was placed in a 1500 mL three-necked flask, and then 1 g of sodium sulphate and 1 g of propylene glycol were added with stirring. The bio-oil and the demulsifier were stirred for 5 minutes, and then the mixture was transferred to a separating funnel to rest for 20 minutes. When the lower layer which was an aqueous solution was clarified and the oil-water interface was clear, an upper layer which was bio-oil II was separated from the aqueous solution.

The performed REY/clay catalyst was added to a 80° C. 1 mol/L of $NH_4NO_3$ solution, and was soaked for 6 hours. Then the catalyst was dried and roasted for 4 hours under 300° C. The catalyst was aged for 5 hours by 100% steam at 800° C. 200 g of catalyst was weighed and placed in a fixed fluidized bed, and the catalytic cracking was carried on under the following parameters: a Weight Hourly Space Velocity (WHSV): 10 $h^{-1}$; a ratio of the catalyst to the bio-oil: 8; a temperature: 550° C.; and a pressure: 0.3 megapascal. An analysis result of the cracking product is shown as Table 2.

TABLE 2

Result of Catalytic Cracking of Bio-oil II (P = 1 atm, T = 28° C.)

| | | | Physical and chemical properties | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm$^2$/s | MJ/kg | C | H | O |
| Bio-oil | — | 32.3 | 6965 | 16.5 | 12.3 | 47.03 | 6.78 | 44.92 |
| Dehydrated bio-oil | — | 7.5 | 6621 | 152.8 | 21.5 | 60.59 | 5.22 | 31.59 |
| Result after modification | 90.7 | — | 352 | 17.4 | 30.7 | 70.82 | 8.64 | 19.89 |

Example 3

1000 g of bio-oil was placed in a 1500 mL three-necked flask, and then 0.6 g of sodium chloride and 0.3 g of polyoxypropylene ether were added with stirring. The bio-oil and the demulsifier were stirred for 5 minutes, and then the mixture was transferred to a separating funnel to rest for 20 minutes. When the lower layer which was an aqueous solution was clarified and the oil-water interface was clear, an upper layer which was bio-oil III was separated from the aqueous solution.

The performed silicon-rich REUSY/clay catalyst was added to a 80° C. 1 mol/L of NH$_4$NO$_3$ solution, and was soaked for 6 hours. Then the catalyst was dried and roasted for 3 hours under 150° C. The catalyst was aged for 3 hours by 100% steam at 600° C. 200 g of catalyst was weighed and placed in a fixed fluidized bed, and the catalytic cracking was carried on under the following parameters: a Weight Hourly Space Velocity (WHSV): 6 h$^{-1}$; a ratio of the catalyst to the bio-oil: 8; a temperature: 450° C.; and a pressure: 0.2 megapascal. An analysis result of the cracking product is shown as Table 3.

TABLE 3

Result of Catalytic Cracking of Bio-oil III (P = 1 atm, T = 28° C.)

| | | | Physical and chemical properties | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm$^2$/s | MJ/kg | C | H | O |
| Bio-oil | — | 32.3 | 6965 | 16.5 | 12.3 | 47.03 | 6.78 | 44.92 |
| Dehydrated bio-oil | — | 18.4 | 6753 | 107.5 | 17.6 | 59.77 | 5.66 | 33.13 |
| Result after modification | 86.5 | — | 374 | 15.7 | 25.3 | 65.05 | 7.97 | 23.35 |

Example 4

1000 g of bio-oil was placed in a 1500 mL three-necked flask, and then 0.5 g of ammonium sulfate and 0.5 g of polyoxylethylene ether are added with stirring. The bio-oil and the demulsifier were stirred for 8 minutes, and then the mixture was transferred to a separating funnel to rest for 20 minutes. When the lower layer which was an aqueous solution was clarified and the oil-water interface was clear, an upper layer which was bio-oil IV was separated from the aqueous solution.

The performed REUSY/clay catalyst was added to a 80° C. 1 mol/L of NH$_4$NO$_3$ solution, and was soaked for 6 hours. Then the catalyst was dried and roasted for 2 hours under 200° C. The catalyst was aged for 6 hours by 100% steam of 700° C. 200 g of catalyst was weighed and placed in the riser reactor, and the catalytic cracking was carried on under the following parameters: a Weight Hourly Space Velocity (WHSV):15 h$^{-1}$; a ratio of the catalyst to the bio-oil: 3; a temperature: 550° C.; and a pressure: 0.3 megapascal. An analysis result of the cracking product is shown as Table 4.

TABLE 4

Result of Catalytic Cracking of Bio-oil IV (P = 1 atm, T = 28° C.)

| | | Physical and chemical properties | | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm$^2$/s | MJ/kg | C | H | O |
| Bio-oil | — | 32.3 | 6965 | 16.5 | 12.3 | 47.03 | 6.78 | 44.92 |
| Dehydrated bio-oil | — | 8.3 | 6794 | 145.5 | 19.7 | 61.78 | 5.50 | 31.56 |
| Result after modification | 80.7 | — | 362 | 14.6 | 28.2 | 70.73 | 7.34 | 19.63 |

Example 5

1000 g of bio-oil was placed in a 1500 mL three-necked flask, and then 0.5 g of sodium sulphate and 0.7 g of propylene glycol were added with stirring. The bio-oil and the demulsifier were stirred for 5 minutes, and then the mixture was transferred to a separating funnel to rest for 20 minutes. When the lower layer which was an aqueous solution was clarified and the oil-water interface was clear, an upper layer which was bio-oil V was separated from the aqueous solution.

The performed REY/clay catalyst was added to a 80° C. 1 mol/L of NH$_4$NO$_3$ solution, and was soaked for 6 hours. Then the catalyst was dried and roasted for 4 hours under 300° C. The catalyst was aged for 5 hours by 100% steam at 800° C. 200 g of catalyst was weighed and placed in a fixed fluidized bed, and the catalytic cracking was carried on under the following parameters: a Weight Hourly Space Velocity (WHSV): 10 h$^{-1}$; a ratio of the catalyst to the bio-oil: 8, a temperature: 550° C.; and a pressure: 0.3 megapascal. An analysis result of the cracking product is shown as Table 5.

TABLE 5

Result of Catalytic Cracking of Bio-oil V (P = 1 atm, T = 28° C.)

| | | Physical and chemical properties | | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm$^2$/s | MJ/kg | C | H | O |
| Bio-oil | — | 32.3 | 6965 | 16.5 | 12.3 | 47.03 | 6.78 | 44.92 |
| Dehydrated bio-oil | — | 8.7 | 6821 | 144.7 | 19.3 | 61.25 | 5.53 | 31.86 |
| Result after modification | 82.5 | — | 362 | 14.4 | 28.7 | 69.73 | 8.04 | 20.91 |

Example 6

1000 g of bio-oil was placed in a 1500 mL three-necked flask, and then 1.2 g of calcium chloride and 0.3 g of propanol were added with stirring. The bio-oil and the demulsifier were stirred for 5 minutes, and then the mixture was transferred to a separating funnel to rest for 20 minutes. When the lower layer which was an aqueous solution was clarified and the oil-water interface was clear, an upper layer which was bio-oil VI was separated from the aqueous solution.

The performed LREHY/clay catalyst was added to a 80° C. 1 mol/L of NH$_4$NO$_3$ solution, and was soaked for 6 hours. Then the catalyst was dried and roasted for 2 hours under 200° C. The catalyst was aged for 8 hours by 100% steam of 500° C. 200 g of catalyst was weighed and placed in a fixed fluidized bed, and the catalytic cracking was carried on under the following parameters: a Weight Hourly Space Velocity (WHSV): 15 h$^{-1}$; a ratio of the catalyst to the bio-oil: 12; a temperature: 600° C.; and a pressure: 0.3 megapascal. An analysis result of the cracking product is shown as Table 6.

TABLE 6

Result of Catalytic Cracking of Bio-oil VI (P = 1 atm, T = 28° C.)

| | Physical and chemical properties | | | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm²/s | MJ/kg | C | H | O |
| Bio-oil | — | 32.3 | 6965 | 16.5 | 12.3 | 47.03 | 6.78 | 44.92 |
| Dehydrated bio-oil | — | 8.1 | 7017 | 146.4 | 20.2 | 61.57 | 5.49 | 31.41 |
| Result after modification | 78.6 | — | 347 | 13.3 | 29.5 | 72.27 | 7.89 | 18.49 |

Example 7

1000 g of bio-oil was placed in a 1500 mL three-necked flask, and then 0.8 g of sodium chloride and 0.4 g of polyoxylethylene ether were added with stirring. The bio-oil and the demulsifier were stirred for 8 minutes, and then the mixture was transferred to a separating funnel to rest for 20 minutes. When the lower layer which was an aqueous solution was clarified and the oil-water interface was clear, an upper layer which was bio-oil VII was separated from the aqueous solution.

The performed silicon-rich REUSY/clay catalyst was added to a 80° C. 1 mol/L of NH$_4$NO$_3$ solution, and was soaked for 6 hours. Then the catalyst was dried and roasted for 3 hours under 150° C. The catalyst was aged for 3 hours by 100% steam at 600° C. 200 g of catalyst was weighed and placed in the riser reactor, and the catalytic cracking was carried on under the following parameters: a Weight Hourly Space Velocity (WHSV): 12 h$^{-1}$; a ratio of the catalyst to the bio-oil: 16; a temperature: 650° C.; and a pressure: 0.5 megapascal. An analysis result of the cracking product is shown as Table 7.

TABLE 7

Result of Catalytic Cracking of Bio-oil VII (P = 1 atm, T = 28° C.)

| | Physical and chemical properties | | | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm²/s | MJ/kg | C | H | O |
| Bio-oil | — | 32.3 | 6965 | 16.5 | 12.3 | 47.03 | 6.78 | 44.92 |
| Dehydrated bio-oil | — | 15.7 | 6926 | 116.4 | 18.2 | 59.89 | 5.22 | 31.61 |
| Result after modification | 74.2 | — | 309 | 12.4 | 32.7 | 75.55 | 7.37 | 15.72 |

Example 8

1000 g of bio-oil was placed in a 1500 mL three-necked flask, and then 0.8 g of sodium chloride and 0.6 g of polyoxypropylene ether were added with stirring. The bio-oil and the demulsifier were stirred for 8 minutes, and then the mixture was transferred to a separating funnel to rest for 20 minutes. When the lower layer which was an aqueous solution was clarified and the oil-water interface was clear, an upper layer which was bio-oil VIII was separated from the aqueous solution.

The performed ZSM-5/clay catalyst was added to a 80° C. 1 mol/L of NH$_4$NO$_3$ solution, and was soaked for 6 hours. Then the catalyst was dried and roasted for 3 hours under 150° C. The catalyst was aged for 2 hours by 100% steam of 500° C. 200 g of catalyst was weighed and placed in a fixed fluidized bed, and the catalytic cracking was carried on under the following parameters: a Weight Hourly Space Velocity (WHSV): 12 h$^{-1}$; a ratio of the catalyst to the bio-oil: 16; a temperature: 650° C.; and a pressure: 0.5 megapascal. An analysis result of the cracking product is shown as Table 8.

TABLE 8

Result of Catalytic Cracking of Bio-oil VIII (P = 1 atm, T = 28° C.)

| | | Physical and chemical properties | | | | | | |
|---|---|---|---|---|---|---|---|---|
| | Yield | Content of water | Acidity mgKOH/100 | Kinematic viscosity | Low calorific value | Element analysis (%) | | |
| | wt. % | wt. % | mL | mm²/s | MJ/kg | C | H | O |
| Bio-oil | — | 32.3 | 6965 | 16.5 | 12.3 | 47.03 | 6.78 | 44.92 |
| Dehydrated bio-oil | — | 14.9 | 6875 | 126.7 | 18.6 | 60.61 | 5.28 | 31.60 |
| Result after modification | 75.3 | — | 286 | 10.8 | 33.9 | 81.73 | 7.41 | 8.85 |

1. As seen from the examples, within the scope of this invention, as the mass ratio between the inorganic ions and the bio-oil, and the mass ratio between the organic demulsifier and the bio-oil become larger, dehydration of the bio-oil gets obvious. This is because mass penalty of the inorganic salt can break the electrical double layers at the oil/water interface, increase the aqueous phase and the polarity thereof, thereby improving oil-water separation; the mass penalty of the organic demulsifier can shorten the time of the oil-water separation.

2. As the acid sites of the performed catalyst are small and unevenly distributed, the deoxygenation properties of the catalyst are weak, and the catalyst gets inactive easily. The ion exchange with the 1 mol/L of $NH_4NO_3$ can obviously increase the acid sites and evenly distribute the acid sites in the catalyst, thereby improving the deoxygenation properties of the catalyst.

Unless otherwise indicated, the numerical ranges involved in the invention include the end values.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for modifying bio-oil produced from biomass pyrolysis, the method comprising:
    1) adding an inorganic salt and an organic demulsifier to a bio-oil, a mass ratio of the inorganic salt to the bio-oil being between 1:2000 and 1:800, and a mass ratio of the organic demulsifier and the bio-oil being between 1:4000 and 1:1000; oscillating or stirring a resulting mixture, resting the resulting mixture, to yield a lower layer being an aqueous solution and an upper layer being the bio-oil, and collecting the bio-oil, wherein the inorganic salt comprises at least one of the following ions: $Na^+$, $K^+$, $NH_4^+$, and $NO_3^-$;
    2) employing a zeolite molecular sieve-loaded clay as a catalyst, and aging the catalyst at a temperature of between 500 and 800° C. for between 2 and 8 hours using steam, to yield a modified catalyst; and
    3) adding the modified catalyst obtained in 2) to a conventional catalytic cracking reactor, injecting the bio-oil obtained in 1) to the conventional catalytic cracking reactor using a piston pump, a ratio of the catalyst to the bio-oil being between 3 and 16, and allowing the bio-oil to react under a weight hourly space velocity (WHSV) of between 6 and 15 $h^{-1}$, a temperature of between 380 and 700° C., and a pressure between 0.1 and 0.8 megapascal.

2. The method of claim 1, wherein the organic demulsifier is selected from: polyoxypropylene ether, polyoxylethylene ether, propylene glycol, and propanol.

3. The method of claim 1, wherein the mass ratio of the inorganic salt to the bio-oil is between 1:1500 and 1:1000; the mass ratio of the organic demulsifier to the bio-oil is between 1:2000 and 1:1300.

4. The method of claim 1, wherein before aging the catalyst in 2), the catalyst exchanges ions with 1 mol/L of $NH_4NO_3$, and then is calcined at between 150 and 300° C. for 2 to 4 hours.

5. The method of claim 1, wherein in 1), the resulting mixture is oscillated or stirred for 3 to 60 minutes, and then is allowed to rest for 20±5 minutes.

6. The method of claim 1, wherein in 1), resting the resulting mixture is carried out for 20 minutes.

7. The method of claim 1, wherein the catalyst employed in 2) is selected from REY zeolite/clay, REUSY zeolite/clay, silicon-rich REUSY zeolite/clay, LREHY zeolite/clay, and ZSM-5 zeolite/clay; the catalyst exchanges ions with 1 mol/L of $NH_4NO_3$, and then is calcined at between 150 and 300° C. for 2 to 4 hours before aging the catalyst in 2).

8. The method of claim 7, wherein the organic demulsifier is selected from: polyoxypropylene ether, polyoxylethylene ether, propylene glycol, and propanol.

9. The method of claim 7, wherein the mass ratio of the inorganic salt to the bio-oil is between 1:1500 and 1:1000; the mass ratio of the organic demulsifier to the bio-oil is between 1:2000 and 1:1300.

10. The method of claim 7, wherein in 1), the resulting mixture is oscillated or stirred for 3 to 60 minutes, and then is allowed to rest for 20±5 minutes.

11. The method of claim 7, wherein in 1), resting the resulting mixture is carried out for 20 minutes.

* * * * *